(No Model.)
A. N. GABEL, Jr., & A. L. GABEL.
CAR COUPLING.
No. 337,257. Patented Mar. 2, 1886.
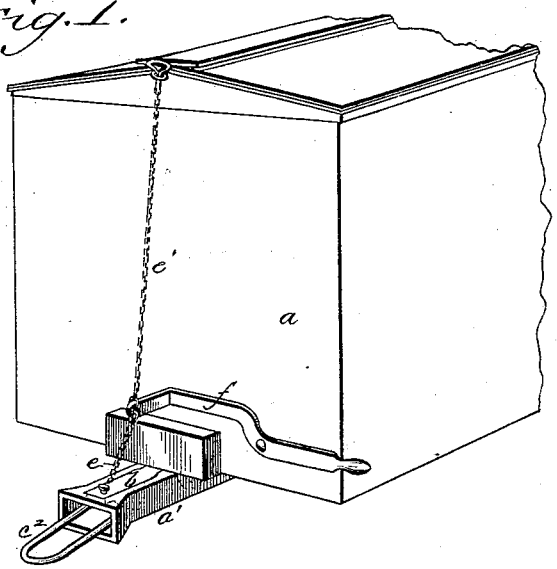
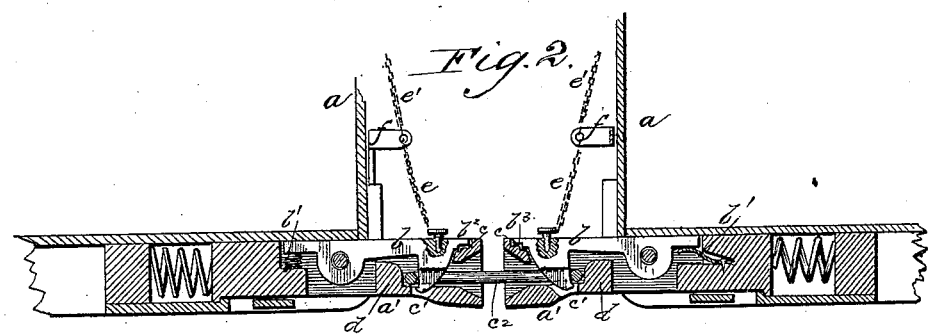
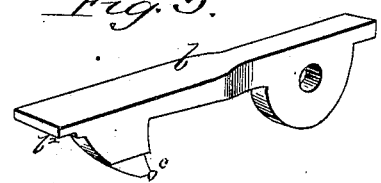
Witnesses.
Inventors.
Alfred N Gabel Jr
Arthur L Gabel
By H Harrison
Attys.

UNITED STATES PATENT OFFICE.

ALFRED N. GABEL, JR., AND ARTHUR L. GABEL, OF ONARGA, ILLINOIS.

CAR-COUPLING.

SPECIFICATION forming part of Letters Patent No. 337,257, dated March 2, 1886.

Application filed November 17, 1885. Serial No. 183,087. (No model.)

*To all whom it may concern:*

Be it known that we, ALFRED N. GABEL, Jr., and ARTHUR L. GABEL, citizens of the United States, residing at Onarga, in the county of Iroquois and State of Illinois, have invented certain new and useful Improvements in Car-Couplings, of which the following is a specification, to wit:

This invention relates to an improvement in car-couplings; and it consists in certain peculiarities of the construction and arrangement of the same, substantially as will be hereinafter more fully set forth and claimed.

In order to enable others skilled in the art to which our invention pertains to make and use the same, we will now proceed to describe its construction and operation, referring to the accompanying drawings, in which—

Figure 1 is a perspective view of our coupling applied to a car. Fig. 2 is a longitudinal vertical section of the same. Fig. 3 is a detail perspective, Fig. 4 a top plan, and Fig. 5 a front view, of the coupling-hook.

$a$ represents a car, and $a'$ the draw-bar, both of which are of ordinary and well-known forms. In the draw-bar is pivoted a hook, $b$, for engaging the link, the rear end of which is extended beyond the pivot and rests upon a spring, $b'$, which acts to throw the hook down and retain it in place, as indicated. The forward end of the hook-arm is formed with shoulders $b^2$, which fit into recesses $b^3$ of the draw-head, and the point of this hook is formed with small notches $c$, which rest upon and receive the edge of the recess or hole $c'$ in the bottom of the draw-head, and effectually prevent any twisting of the hook under the action of the link. The forward side of the hook is rounded or beveled off to admit of the link $c^2$ easily lifting the hook as it passes in, and in rear of the hook the draw-head is cast or formed with an abutment, $d$, to prevent the link going too far back. A chain, $e$, is attached to the upper side of the hook and led to the end of a lever, $f$, pivoted on the car-body within easy reach from the side, so that the operator need not pass between the cars and run any risk of accident. A second chain, $e'$, is attached to said lever and extended to the roof of the car, to permit the coupling to be operated from that point. It will be seen that the link automatically lifts the hook as it enters, and it drops back by the action of the spring to couple the cars.

The device is readily attached to any draw-head, and is strong and durable and not liable to get out of order.

Having thus fully described our invention, what we claim as new, and desire to secure by Letters Patent, is—

In a car-coupler, the combination, with the draw-head $a'$, formed with the socket $b^3$, abutment $d$, and recess or hole $c'$, of the pivoted arm $b$, formed with the hook having shoulders or notches $c$, the spring $b'$ under the rear end of the arm, and the chain $e$ and lever $f$, all constructed and arranged to operate substantially as and for the purpose set forth.

In testimony whereof we affix our signatures in presence of two witnesses.

ALFRED N. GABEL, JR.
ARTHUR L. GABEL.

Witnesses:
WILLIAM C. MORRIS,
CYRUS B. BREWER.